US007489979B2

(12) United States Patent
Rosenberg (10) Patent No.: US 7,489,979 B2
(45) Date of Patent: Feb. 10, 2009

(54) SYSTEM, METHOD AND COMPUTER PROGRAM PRODUCT FOR REJECTING OR DEFERRING THE PLAYING OF A MEDIA FILE RETRIEVED BY AN AUTOMATED PROCESS

(75) Inventor: Louis B. Rosenberg, Arroyo Grande, CA (US)

(73) Assignee: Outland Research, LLC, Pismo Beach, CA (US)

( * ) Notice: Subject to any disclaimer, the term of this patent is extended or adjusted under 35 U.S.C. 154(b) by 546 days.

(21) Appl. No.: 11/285,534

(22) Filed: Nov. 22, 2005

(65) Prior Publication Data

US 2006/0167943 A1    Jul. 27, 2006

Related U.S. Application Data

(60) Provisional application No. 60/648,197, filed on Jan. 27, 2005, provisional application No. 60/665,291, filed on Mar. 26, 2005, provisional application No. 60/651,771, filed on Feb. 9, 2005.

(51) Int. Cl.
*G06F 17/00* (2006.01)

(52) U.S. Cl. ............................ 700/94; 84/612; 715/716; 707/104.1

(58) Field of Classification Search ..................... 700/94
See application file for complete search history.

(56) References Cited

U.S. PATENT DOCUMENTS 4,018,121 A    4/1977    Chower (Continued)

FOREIGN PATENT DOCUMENTS

DE    19650900    6/1998

(Continued)

OTHER PUBLICATIONS

U.S. Appl. No. "11/610,615", filed Dec. 14, 2006, Rosenberg.

(Continued)

*Primary Examiner*—Curtis Kuntz
*Assistant Examiner*—Paul McCord
(74) *Attorney, Agent, or Firm*—Thomas F. Lebens; Sinsheimer Juhnke Lebens & McIvor, LLP (57) ABSTRACT

System, method and computer program product for rejecting or deferring the playing of a media file retrieved by an automated process. Rejection or deferral of an automatically playing media file is accomplished by a simplified user interface which presumes that a currently playing media file is acceptable unless the user signals the media player within a given timeframe. Signaling of the media player is accomplished using one or more sensors. The sensors include but are not limited to a motion sensor, an inclination sensor, a gesture sensor, a video sensor, a push-button switch and any combination thereof. The rejection or deferral of a media file by the user results in that file not being automatically selected again by the automated processes for at least a predetermined amount of time. The rejection or deferral of a media file by the user may also result in updating a record in a memory that is used by the predictive program to select media files in the future and thereby enable the predictive program to automatically select media files in the future that are more likely to match a users media file preferences at that time.

22 Claims, 5 Drawing Sheets

U.S. PATENT DOCUMENTS

| | | | |
|---|---|---|---|
| 4,054,749 A | 10/1977 | Suzuki | |
| 4,091,302 A | 5/1978 | Yamashita | |
| 4,337,529 A | 6/1982 | Morokawa | |
| 4,360,345 A | 11/1982 | Hon | |
| 4,430,595 A | 2/1984 | Nakasone | |
| 4,490,810 A | 12/1984 | Hon | |
| 4,712,101 A | 12/1987 | Culver | |
| 4,788,983 A | 12/1988 | Brink et al. | |
| 4,823,634 A | 4/1989 | Culver | |
| 4,868,549 A | 9/1989 | Affinito | |
| 4,907,973 A | 3/1990 | Hon | |
| 4,919,418 A | 4/1990 | Miller | |
| 4,934,694 A | 6/1990 | McIntosh | |
| 4,949,089 A | 8/1990 | Ruszkowski, Jr. | |
| 4,983,901 A | 1/1991 | Lehmer | |
| 5,047,918 A | 9/1991 | Schwartz et al. | |
| 5,047,952 A | 9/1991 | Kramer et al. | |
| 5,164,530 A | 11/1992 | Iwase | |
| 5,185,561 A | 2/1993 | Good | |
| 5,186,629 A | 2/1993 | Rohen | |
| 5,189,355 A | 2/1993 | Larkins | |
| 5,215,468 A | 6/1993 | Lauffer | |
| 5,220,260 A | 6/1993 | Schuler | |
| 5,267,942 A | 12/1993 | Saperston | |
| 5,273,038 A | 12/1993 | Beavin | |
| 5,296,846 A | 3/1994 | Ledley | |
| 5,296,871 A | 3/1994 | Paley | |
| 5,451,192 A | 9/1995 | Hefele | |
| 5,491,546 A | 2/1996 | Wascher | |
| 5,499,360 A | 3/1996 | Barbara et al. | |
| 5,534,917 A | 7/1996 | MacDougall | |
| 5,559,412 A | 9/1996 | Schuler | |
| 5,572,201 A | 11/1996 | Graham et al. | |
| 5,592,143 A | 1/1997 | Romney | |
| 5,614,687 A | 3/1997 | Yamada et al. | |
| 5,629,594 A | 5/1997 | Jacobus | |
| 5,634,051 A | 5/1997 | Thomson | |
| 5,643,087 A | 7/1997 | Marcus | |
| 5,666,138 A | 9/1997 | Culver | |
| 5,690,582 A | 11/1997 | Ulrich et al. | |
| 5,699,441 A | 12/1997 | Sagawa et al. | |
| 5,701,140 A | 12/1997 | Rosenberg | |
| 5,704,791 A | 1/1998 | Gillio | |
| 5,709,219 A | 1/1998 | Chen | |
| 5,721,566 A | 2/1998 | Rosenberg | |
| 5,724,264 A | 3/1998 | Rosenberg | |
| 5,728,960 A | 3/1998 | Sitrick | |
| 5,731,804 A | 3/1998 | Rosenberg | |
| 5,742,278 A | 4/1998 | Chen | |
| 5,747,714 A | 5/1998 | Kniest et al. | |
| 5,754,023 A | 5/1998 | Roston | |
| 5,755,577 A | 5/1998 | Gillio | |
| 5,767,839 A | 6/1998 | Rosenberg | |
| 5,769,640 A | 6/1998 | Jacobus | |
| 5,791,908 A | 8/1998 | Gillio | |
| 5,800,177 A | 9/1998 | Gillio | |
| 5,800,178 A | 9/1998 | Gillio | |
| 5,807,267 A | 9/1998 | Bryars et al. | |
| 5,821,920 A | 10/1998 | Rosenberg | |
| 5,825,308 A | 10/1998 | Rosenberg | |
| 5,828,197 A | 10/1998 | Martin | |
| 5,839,901 A | 11/1998 | Karkanen | |
| 5,857,939 A | 1/1999 | Kaufman | |
| 5,870,740 A | 2/1999 | Rose et al. | |
| 5,882,206 A | 3/1999 | Gillio | |
| 5,889,670 A | 3/1999 | Schuler | |
| 5,889,672 A | 3/1999 | Schuler | |
| 5,890,128 A | 3/1999 | Diaz et al. | |
| 5,890,995 A | 4/1999 | Bobick et al. | |
| 5,897,437 A | 4/1999 | Nishiumi | |
| 5,928,248 A | 7/1999 | Acker | |
| 5,941,837 A | 8/1999 | Amano et al. | |
| 5,952,596 A | 9/1999 | Kondo | |
| 5,953,693 A | 9/1999 | Sakiyama et al. | |
| 5,989,188 A | 11/1999 | Birkhoelzer et al. | |
| 6,013,007 A | 1/2000 | Root | |
| 6,024,576 A | 2/2000 | Moore | |
| 6,088,017 A | 7/2000 | Tremblay | |
| 6,096,004 A | 8/2000 | Megland | |
| 6,106,301 A | 8/2000 | Merril | |
| 6,111,577 A | 8/2000 | Ziles | |
| 6,119,114 A | 9/2000 | Smadja | |
| 6,154,201 A | 11/2000 | Levin et al. | |
| 6,160,489 A | 12/2000 | Perry | |
| 6,177,905 B1 | 1/2001 | Welch | |
| 6,192,340 B1 * | 2/2001 | Abecassis | 704/270 |
| 6,199,067 B1 | 3/2001 | Geller | |
| 6,211,861 B1 | 4/2001 | Rosenberg et al. | |
| 6,230,047 B1 | 5/2001 | McHugh | |
| 6,244,742 B1 | 6/2001 | Yamada | |
| 6,246,362 B1 | 6/2001 | Tsubata | |
| 6,256,011 B1 | 7/2001 | Culver | |
| 6,266,612 B1 | 7/2001 | Dussell | |
| 6,285,317 B1 | 9/2001 | Ong | |
| 6,287,262 B1 | 9/2001 | Amano et al. | |
| 6,292,747 B1 | 9/2001 | Amro et al. | |
| 6,298,323 B1 | 10/2001 | Kaemmerer | |
| 6,300,938 B1 | 10/2001 | Culver | |
| 6,304,520 B1 | 10/2001 | Watanabe | |
| 6,314,094 B1 | 11/2001 | Boys et al. | |
| 6,323,412 B1 | 11/2001 | Loo | |
| 6,351,710 B1 | 2/2002 | Mays | |
| 6,366,272 B1 | 4/2002 | Rosenberg | |
| 6,376,971 B1 | 4/2002 | Pelrine | |
| 6,401,027 B1 | 6/2002 | Xu et al. | |
| 6,401,037 B1 | 6/2002 | Muller et al. | |
| 6,411,896 B1 | 6/2002 | Shuman et al. | |
| 6,429,846 B2 | 8/2002 | Rosenberg | |
| 6,470,207 B1 | 10/2002 | Simon | |
| 6,470,302 B1 | 10/2002 | Cunningham | |
| 6,477,239 B1 | 11/2002 | Ohki et al. | |
| 6,498,982 B2 | 12/2002 | Bellesfield et al. | |
| 6,515,593 B1 | 2/2003 | Stark et al. | |
| 6,515,651 B1 | 2/2003 | Berstis | |
| 6,522,292 B1 | 2/2003 | Ellenby et al. | |
| 6,526,411 B1 * | 2/2003 | Ward | 707/102 |
| 6,539,232 B2 | 3/2003 | Hendrey et al. | |
| 6,563,487 B2 | 5/2003 | Martin | |
| 6,564,210 B1 | 5/2003 | Korda et al. | |
| 6,572,511 B1 | 6/2003 | Volpe | |
| 6,598,707 B2 | 7/2003 | Nakagaki et al. | |
| 6,607,493 B2 | 8/2003 | Song | |
| 6,618,593 B1 | 9/2003 | Drutman et al. | |
| 6,623,427 B2 | 9/2003 | Mandigo | |
| 6,626,728 B2 | 9/2003 | Holt | |
| 6,636,835 B2 | 10/2003 | Ragsdale-Elliott et al. | |
| 6,640,187 B1 | 10/2003 | Chenault | |
| 6,655,817 B2 | 12/2003 | Devlin | |
| 6,657,116 B1 * | 12/2003 | Gunnerson | 84/615 |
| 6,665,644 B1 | 12/2003 | Kanevsky et al. | |
| 6,671,736 B2 | 12/2003 | Virine et al. | |
| 6,680,675 B1 | 1/2004 | Suzuki | |
| 6,686,531 B1 | 2/2004 | Pennock et al. | |
| 6,686,911 B1 | 2/2004 | Levin | |
| 6,697,044 B2 | 2/2004 | Shahoian | |
| 6,697,048 B2 | 2/2004 | Rosenberg et al. | |
| 6,721,706 B1 | 4/2004 | Strubbe et al. | |
| 6,732,090 B2 | 5/2004 | Shanahan et al. | |
| 6,735,568 B1 | 5/2004 | Buckwalter et al. | |
| 6,749,537 B1 | 6/2004 | Hickman | |
| 6,768,066 B2 | 7/2004 | Wehrenberg | |
| 6,768,246 B2 | 7/2004 | Pelrine | |
| 6,772,026 B2 | 8/2004 | Bradbury et al. | |
| 6,781,289 B2 | 8/2004 | Levin | |

| | | |
|---|---|---|
| 6,801,837 B2 | 10/2004 | Carlstedt et al. |
| 6,804,643 B1 | 10/2004 | Kiss |
| 6,808,472 B1 | 10/2004 | Hickman |
| 6,808,473 B2 | 10/2004 | Hisano |
| 6,812,394 B2 | 11/2004 | Weissflog |
| 6,812,624 B1 | 11/2004 | Qibing |
| 6,822,635 B2 | 11/2004 | Shahoian |
| 6,858,970 B2 | 2/2005 | Malkin |
| 6,863,220 B2 | 3/2005 | Selker |
| 6,871,142 B2 | 3/2005 | Kumada et al. |
| 6,879,284 B2 | 4/2005 | Dufek |
| 6,882,086 B2 | 4/2005 | Kornbluh |
| 6,885,362 B2 | 4/2005 | Suomela |
| 6,888,457 B2 | 5/2005 | Wilkinson et al. |
| 6,906,533 B1 | 6/2005 | Yoshida |
| 6,906,643 B2 | 6/2005 | Samadani |
| 6,915,295 B2 | 7/2005 | Okamoto et al. |
| 6,917,373 B2 * | 7/2005 | Vong et al. .................. 715/840 |
| 6,921,351 B1 | 7/2005 | Hickman |
| 6,929,481 B1 | 8/2005 | Alexander |
| 6,941,324 B2 * | 9/2005 | Plastina et al. ........... 707/104.1 |
| 6,950,695 B2 | 9/2005 | Chen |
| 6,956,538 B2 | 10/2005 | Moore |
| 6,965,842 B2 | 11/2005 | Rekimoto |
| 6,970,088 B2 | 11/2005 | Kovach |
| 6,978,684 B2 * | 12/2005 | Nurse ...................... 73/862.41 |
| 6,829,599 B2 | 1/2006 | Chidlovskii |
| 6,982,697 B2 | 1/2006 | Wilson |
| 6,982,700 B2 | 1/2006 | Rosenberg et al. |
| 6,983,139 B2 | 1/2006 | Dowling et al. |
| 6,985,143 B2 | 1/2006 | Pharr |
| 6,986,320 B2 | 1/2006 | Shelton |
| 6,987,221 B2 * | 1/2006 | Platt ............................ 84/601 |
| 7,003,122 B2 | 2/2006 | Chen |
| 7,007,001 B2 * | 2/2006 | Oliver et al. .................. 706/21 |
| 7,012,593 B2 | 3/2006 | Yoon et al. |
| 7,023,423 B2 | 4/2006 | Rosenberg |
| 7,027,823 B2 | 4/2006 | Mikuni |
| 7,031,875 B2 | 4/2006 | Ellenby et al. |
| 7,046,588 B2 * | 5/2006 | Heo ........................ 369/32.01 |
| 7,089,264 B1 | 8/2006 | Guido |
| 7,092,964 B1 | 8/2006 | Dougherty et al. |
| 7,100,835 B2 | 9/2006 | Selker |
| 7,138,575 B2 | 11/2006 | Childs et al. |
| 7,156,773 B2 | 1/2007 | Takai et al. |
| 7,166,062 B1 | 1/2007 | Watterson et al. |
| 7,177,672 B2 | 2/2007 | Nissila |
| 7,181,438 B1 | 2/2007 | Szabo |
| 7,199,708 B2 | 4/2007 | Terauchi et al. |
| 7,207,935 B1 | 4/2007 | Lipo |
| 7,225,565 B2 * | 6/2007 | DiBenedetto et al. ......... 36/132 |
| 7,227,071 B2 | 6/2007 | Tagawa et al. |
| 7,229,416 B2 | 6/2007 | Chen |
| 7,232,416 B2 | 6/2007 | Czernicki |
| 7,249,126 B1 | 7/2007 | Ginsburg et al. |
| 7,283,997 B1 | 10/2007 | Howard et al. |
| RE39,906 E | 11/2007 | Roston et al. |
| 7,293,060 B2 * | 11/2007 | Komsi ....................... 709/203 |
| 7,310,676 B2 | 12/2007 | Bourne |
| 7,310,895 B2 * | 12/2007 | Whittlesey et al. ............ 36/137 |
| 7,312,766 B1 | 12/2007 | Edwards |
| 7,312,785 B2 | 12/2007 | Tsuk et al. |
| 7,342,649 B2 | 3/2008 | Waibel |
| 7,344,508 B2 | 3/2008 | Surina |
| 7,348,967 B2 * | 3/2008 | Zadesky et al. ............. 345/173 |
| 7,359,624 B2 | 4/2008 | Adams et al. |
| 7,373,820 B1 | 5/2008 | James |
| 7,394,405 B2 | 7/2008 | Godden |
| 2001/0003542 A1 | 6/2001 | Kita |
| 2001/0020242 A1 | 9/2001 | Gupta |
| 2002/0016786 A1 | 2/2002 | Pitkow et al. |
| 2002/0054060 A1 | 5/2002 | Schena |
| 2002/0059296 A1 | 5/2002 | Hayashi |
| 2002/0078045 A1 | 6/2002 | Dutta |
| 2002/0091049 A1 | 7/2002 | Hisano |
| 2002/0091796 A1 | 7/2002 | Higginson |
| 2002/0116476 A1 * | 8/2002 | Eyal et al. .................... 709/219 |
| 2002/0133418 A1 | 9/2002 | Hammond et al. |
| 2002/0142701 A1 | 10/2002 | Rosenberg |
| 2002/0152077 A1 | 10/2002 | Patterson |
| 2002/0186221 A1 | 12/2002 | Bell |
| 2003/0009497 A1 | 1/2003 | Yu |
| 2003/0011467 A1 | 1/2003 | Suomela |
| 2003/0018527 A1 | 1/2003 | Filepp |
| 2003/0033287 A1 | 2/2003 | Shanahan et al. |
| 2003/0041105 A1 | 2/2003 | Patrick |
| 2003/0047683 A1 | 3/2003 | Kaushal |
| 2003/0069077 A1 | 4/2003 | Korienek |
| 2003/0076301 A1 * | 4/2003 | Tsuk et al. ................... 345/159 |
| 2003/0089218 A1 * | 5/2003 | Gang et al. .................... 84/615 |
| 2003/0110038 A1 | 6/2003 | Sharma |
| 2003/0115193 A1 | 6/2003 | Okamoto et al. |
| 2003/0132301 A1 | 7/2003 | Selker |
| 2003/0135490 A1 | 7/2003 | Barrett et al. |
| 2003/0187837 A1 | 10/2003 | Cutliss |
| 2003/0193572 A1 | 10/2003 | Wilson |
| 2003/0195884 A1 | 10/2003 | Boyd et al. |
| 2003/0217007 A1 | 11/2003 | Fukushima |
| 2003/0220917 A1 | 11/2003 | Copperman et al. |
| 2003/0236582 A1 * | 12/2003 | Zamir et al. ................... 700/94 |
| 2004/0012506 A1 | 1/2004 | Fujiwara |
| 2004/0015714 A1 | 1/2004 | Abraham et al. |
| 2004/0017482 A1 | 1/2004 | Weitman |
| 2004/0019588 A1 | 1/2004 | Doganata et al. |
| 2004/0025563 A1 | 2/2004 | Stierle |
| 2004/0068486 A1 | 4/2004 | Chidlovski |
| 2004/0097806 A1 | 5/2004 | Hunter |
| 2004/0103087 A1 | 5/2004 | Mukherjee et al. |
| 2004/0114129 A1 | 6/2004 | Gogolla |
| 2004/0124248 A1 | 7/2004 | Selker |
| 2004/0125073 A1 | 7/2004 | Potter |
| 2004/0164971 A1 | 8/2004 | Hayward |
| 2004/0166937 A1 | 8/2004 | Rothschild |
| 2004/0186824 A1 | 9/2004 | Delic et al. |
| 2004/0204240 A1 | 10/2004 | Barney |
| 2004/0215469 A1 | 10/2004 | Fukushima |
| 2004/0219961 A1 | 11/2004 | Ellenby |
| 2004/0224638 A1 | 11/2004 | Fadell et al. |
| 2004/0225519 A1 | 11/2004 | Martin |
| 2004/0248653 A1 | 12/2004 | Barros |
| 2004/0252397 A1 * | 12/2004 | Hodge et al. ................... 360/60 |
| 2005/0012611 A1 | 1/2005 | Osman |
| 2005/0021470 A1 * | 1/2005 | Martin et al. .................. 705/51 |
| 2005/0039206 A1 * | 2/2005 | Opdycke ...................... 725/35 |
| 2005/0049113 A1 | 3/2005 | Yueh |
| 2005/0071328 A1 | 3/2005 | Lawrence et al. |
| 2005/0080786 A1 | 4/2005 | Fish |
| 2005/0096047 A1 | 5/2005 | Haberman et al. |
| 2005/0107218 A1 | 5/2005 | Chuang et al. |
| 2005/0107688 A1 | 5/2005 | Strommer |
| 2005/0126370 A1 | 6/2005 | Takai |
| 2005/0129253 A1 | 6/2005 | Chen |
| 2005/0130802 A1 | 6/2005 | Kinnunen et al. |
| 2005/0134479 A1 | 6/2005 | Isaji |
| 2005/0139660 A1 | 6/2005 | Maxymych et al. |
| 2005/0141729 A1 | 6/2005 | Kanzaki |
| 2005/0143173 A1 | 6/2005 | Barney et al. |
| 2005/0149213 A1 | 7/2005 | Guzak et al. |
| 2005/0149499 A1 | 7/2005 | Franz et al. |
| 2005/0154636 A1 | 7/2005 | Hildinger et al. |
| 2005/0174975 A1 | 8/2005 | Mgrdechian et al. |
| 2005/0182564 A1 | 8/2005 | Kim |
| 2005/0197237 A1 | 9/2005 | Chen |
| 2005/0210419 A1 | 9/2005 | Kela et al. |
| 2005/0212749 A1 | 9/2005 | Marvit et al. |
| 2005/0222981 A1 | 10/2005 | Lawrence et al. |

| | | |
|---|---|---|
| 2005/0222989 A1 | 10/2005 | Haveliwala et al. |
| 2005/0233859 A1 | 10/2005 | Takai et al. |
| 2005/0233861 A1 | 10/2005 | Hickman et al. |
| 2005/0234638 A1 | 10/2005 | Ogaki |
| 2005/0240342 A1 | 10/2005 | Ishihara |
| 2005/0266961 A1* | 12/2005 | Shum et al. ............. 482/8 |
| 2005/0278317 A1 | 12/2005 | Gross et al. |
| 2005/0286546 A1 | 12/2005 | Basseli et al. |
| 2006/0004512 A1 | 1/2006 | Herbst |
| 2006/0017692 A1 | 1/2006 | Wehrenberg et al. |
| 2006/0020177 A1 | 1/2006 | Seo et al. |
| 2006/0022955 A1 | 2/2006 | Kennedy |
| 2006/0026521 A1 | 2/2006 | Hotelling et al. |
| 2006/0052132 A1 | 3/2006 | Naukkarinen |
| 2006/0060068 A1 | 3/2006 | Hwang |
| 2006/0084551 A1 | 4/2006 | Volpe, Jr. |
| 2006/0095412 A1 | 5/2006 | Zito et al. |
| 2006/0097991 A1 | 5/2006 | Hotelling et al. |
| 2006/0098772 A1 | 5/2006 | Reho et al. |
| 2006/0101377 A1* | 5/2006 | Toyama et al. ............. 717/104 |
| 2006/0102171 A1 | 5/2006 | Gavish |
| 2006/0107822 A1 | 5/2006 | Bowen |
| 2006/0111621 A1* | 5/2006 | Coppi et al. ............. 600/300 |
| 2006/0136173 A1* | 6/2006 | Case et al. ............. 702/182 |
| 2006/0161521 A1 | 7/2006 | Rosenberg |
| 2006/0164382 A1 | 7/2006 | Kulas |
| 2006/0167576 A1 | 7/2006 | Rosenberg |
| 2006/0167943 A1 | 7/2006 | Rosenberg |
| 2006/0169125 A1 | 8/2006 | Ashkenazi |
| 2006/0173837 A1 | 8/2006 | Berstis et al. |
| 2006/0188109 A1 | 8/2006 | Makino et al. |
| 2006/0189386 A1 | 8/2006 | Rosenberg |
| 2006/0195361 A1 | 8/2006 | Rosenberg |
| 2006/0229163 A1 | 10/2006 | Waters |
| 2006/0243120 A1 | 11/2006 | Takai |
| 2006/0253210 A1 | 11/2006 | Rosenberg |
| 2006/0256082 A1 | 11/2006 | Cho |
| 2006/0173828 A1 | 12/2006 | Rosenberg |
| 2006/0276919 A1 | 12/2006 | Shirai |
| 2006/0288846 A1 | 12/2006 | Logan |
| 2007/0021269 A1 | 1/2007 | Shum |
| 2007/0027000 A1 | 2/2007 | Shirai |
| 2007/0044641 A1 | 3/2007 | McKinney et al. |
| 2007/0060446 A1 | 3/2007 | Asukai |
| 2007/0067294 A1 | 3/2007 | Ward et al. |
| 2007/0074618 A1 | 4/2007 | Vergo |
| 2007/0074619 A1 | 4/2007 | Vergo |
| 2007/0079691 A1 | 4/2007 | Turner |
| 2007/0103431 A1 | 5/2007 | Tabatowski-Bush |
| 2007/0113725 A1 | 5/2007 | Oliver |
| 2007/0125852 A1* | 6/2007 | Rosenberg ............. 235/435 |
| 2007/0135264 A1 | 6/2007 | Rosenberg |
| 2007/0145680 A1 | 6/2007 | Rosenberg |
| 2007/0156676 A1 | 7/2007 | Rosenberg |
| 2007/0156677 A1 | 7/2007 | Szabo |
| 2007/0173377 A1 | 7/2007 | Jamsen et al. |
| 2007/0174416 A1 | 7/2007 | Waters |
| 2007/0198182 A1 | 8/2007 | Singh |
| 2007/0236493 A1 | 10/2007 | Horiuchi |
| 2007/0271228 A1 | 11/2007 | Querel |
| 2008/0005075 A1 | 1/2008 | Horvitz |
| 2008/0016040 A1 | 1/2008 | Jones et al. |
| 2008/0016218 A1 | 1/2008 | Jones et al. |
| 2008/0147217 A1 | 6/2008 | Chung |

FOREIGN PATENT DOCUMENTS

| | | |
|---|---|---|
| WO | WO0273818 | 9/2002 |
| WO | WO200686439 | 8/2006 |

OTHER PUBLICATIONS

U.S. Appl. No. "11/267,079", filed Nov. 3, 2005, Rosenberg.
"Dialogr", http://www.dialogr.com/PostThought.cfm?/TopicId=684, first printed May 22, 2007.
U.S. Appl. No. "11/561,981", filed Nov 21, 2006, Rosenberg.
U.S. Appl. No. "11/682,874", filed Mar. 6, 2007, Rosenberg.
U.S. Appl. No. "11/344,613", filed Jan. 31, 2006, Rosenberg.
Shaninpoor, Mohsen "Electro-mechanics of ionoelastic beams as electrically-controllable artificial muscles", *SPIE Conference on Electroactive Polymer Actuators and Devices, SPEE* vol. 3669, 1999.
Oguro, K et al., "Polymer Electroyte Actuator with Gold Electrodes", *SPIE Conference on Electroactive Polymer Actuators and Devices, SPEE* vol. 3669, 1999.
Lumia, R et al., "Microgripper design using electro-active polymers", *SPIE Conference on Electroactive Polymer Actuators and Devices, SPEE* vol. 3669, 1999, (Mar. 1999).
U.S. Appl. No. "11/278,531", filed Apr. 3, 2006, Rosenberg.
U.S. Appl. No. "11/697,704", filed Apr. 6, 2007, Rosenberg.
Sharper Image, "Laser Baseball", *Item#PS115; downloaded from* www.sharperimage.com on Dec. 09, 2005, 18 pages.
U.S. Appl. No. "11/610,615", filed May 10, 2007, Rosenberg.
U.S. Appl. No. "11/677,045", filed Feb. 20, 2007, Rosenberg.
U.S. Appl. No. "11/619,605", filed Jan. 3, Rosenberg.
U.S. Appl. No. "11/610,494", filed Dec. 13, 2006, Rosenberg.
U.S. Appl. No. "11/260,000", filed Oct. 26, 2005, Rosenberg.
U.S. Appl. No. "11/299,096", filed Dec. 9, 2005, Rosenberg.
U.S. Appl. No. "11/315,762", filed Dec. 21, 2005, Rosenberg.
U.S. Appl. No. "11/341,025", filed Jan. 27, 2006, Rosenberg.
U.S. Appl. No. "11/383,195", filed Aug. 10, 2006, Rosenberg.
U.S. Appl. No. "11/422,065", filed Aug. 24, 2006, Rosenberg.
U.S. Appl. No. "11/425,981", filed Jun. 22, 2007, Rosenberg.
U.S. Appl. No. "11/428,341", filed Oct. 12, 2006, Rosenberg.
Wu and Childers, "Gender Recognition from Speech Part I: Coarse Analysis", (1991).
Wu and Childers, "Gender Recognition from Speech Part II: Fine Analysis", (1991).
Brin and Page, "The Anatomy of a Large-Scale Hypertextual Search Engine", *Stanford University*, 1998.
Hayashi, J et al., "A Method for Estimating and Modeling Age and Gender Using Facial Image Processing", (2001).
Schotz, "Automatic prediction of speaker age using CART", (2003).
Castrillon, et al., "Identity and Gender Recognition Using the ENCARA Real-Time Face Detector", *Caepia*, (Nov. 2003).
"www.wwmx.org", *First visited in May 2005*.
*Office Action from U.S. Appl. No. 11/282,379, filed Sep. 18, 2007 (3502.010)*.
Kornbluh, et al., "High-field Electrostriction of Elastomeric Polymer Dielectrics for Actuation", *SPIE Conference on Electroactive Polymer Actuators and Devices*, (Mar. 1999).
Kawahara, et al., "Designing a Universal Remote Control for the Ubiquitous Computing Environment", *IEE Times, 2003*.
Abrial, et al., "A New Contactless Smartcard IC Using an On-Chip Antenna and an Asynchronour Micro-controller", (2001).
U.S. Appl. No. "11/341,100", filed Jan. 27, 2006, Rosenberg.
U.S. Appl. No. "11/278,120", filed Oct. 5, 2006, Rosenberg.
Morhring, et al., "Video See-Through AR on Consumer Cell-Phones"(Mar. 2004).
Gordon, et al., "Silicon Optical Navigation", (2003).
"Remotely Operated Vehicles Seaeye Falcon", www.roperresourses.com, (May 2002).
"Remotely Operated Vehicle", www.seabotix.com/products/ibv150.htm. (Dec. 2001).
"Unmanned Aircraft Systems", www.baiaerosystems.com, (1985).
"www.gesturetek.com", (Jul. 1996).
"www.reactrix.com", (2002).
*Office Action from U.S. Appl. No. 11/422,065, dated Mar. 28, 2007, (3502.043)*.
*Office Action from U.S. Appl. No. 11/422,065, dated Aug. 31, 2007, (3502.043)*.
U.S. Appl. No. "11/749,134", filed May 15, 2007, Rosenberg.
U.S. Appl. No. "11/749,137", filed May 15, 2007, Rosenberg.
U.S. Appl. No. "11/762,017", filed Oct. 4, 2007, Rosenberg.

U.S. Appl. No. "11/772,803", filed Jul. 12, 2007, Rosenberg.
U.S. Appl. No. "11/846,530", filed Aug. 29, 2007, Rosenberg.
U.S. Appl. No. "11/851,340", filed Sep. 6, 2007, Rosenberg.
U.S. Appl. No. "11/841,868", filed Aug. 20, 2007, Rosenberg.
U.S. Appl. No. "11/461,375", field Nov. 9, 2006, Rosenberg.
U.S. Appl. No. "11/555,784", filed May 24, 2007, Rosenberg.
U.S. Appl. No. "11/563,610", filed Jun. 28, 2007, Rosenberg.
U.S. Appl. No. "11/697,706", filed Aug. 16, 2007, Rosenberg.
U.S. Appl. No. "11/618858", filed Jun. 14, 2007, Rosenberg.
U.S. Appl. No. "11/676,298", filed Jul. 5, 2007, Rosenberg.
U.S. Appl. No. "11/697,732", filed Apr. 8, 2007, Rosenberg.
U.S. Appl. No. "11/744,879", filed Sep. 20, 2007, Rosenberg.
U.S. Appl. No. "11/775,314", filed Jul. 30, 2007, Rosenberg.
"Bodybug Calorie Mangement System", downloaed from www.ubergizmo.com/15/archives/2005/03/boddybug_calorie.html on Jul. 9, 2007, (Mar. 18, 2005).
"www.fitlinxx.com", downloaded from www.fitlinxx.com/brand/about_tour3.htm on Jul. 9, 2007, (2003).
"YMCA", downloaded from www.ymcamidpen.org/textpage.php?b=2&p=fitlinxx on Jul. 10, 2007, (2003).
Demartini, Marilyn "Cyber Fitness", downloaded from www.physicalmag.com/articlesTemp.as?dept=14&articleID=1812 on Jul. 10, 2007, (Feb. 18, 2001).
Munro, Aria "eNewsChannels", downloaded from enewschannels.com/20070106enc582-025321.php on Aug. 5, 2007, (Jul. 1, 2007).
Oliver, Nuria et al., "Enhancing Exercise Performance through Real-time Phsiological Monitoring and Music: A User Study", *Proceeding of Pervasive Health 2006. Innsbruck, Austria. Nov. 2006*, et all =Lucas Kreger-Stckles, (Nov. 2006).
Betlyon, Jim "Omni Fitness Equipment Stores Integrate Physical Genius Online Fitness Tools", downloaded from www.physicalgenius.com on Aug. 5, 2007, (Apr. 19, 2000).
"Tune Your Run", *Apple Computer/Nike*, downloaded from www.apple.com on Jun. 28, 2006.
Nintendo, "Kirby's Tilt N'Tumble", downloaded from www.nintendo.com; Nov. 14, 2006; 2 pages.
Cook, Perry et al., "Using DSP-Based Parametric Physical Synetheses Models to Study Human Sound Perception", *2003 IEEE Workshop on Applications of Signal Processing to Audio and Acoustics*, (2003).
"Yahoo media player", downloaded from www.yahoo.com on Sep. 19, 2006. Not admitted as prior art.
McKinney and Moelants, "Extracting the Perceotual Tempo from Music", *published at the ISMIR 2004 5th International Conference on Music Information Retrieval*, (2004).
"PCDJ Red Virtual Rack Module", *by Visionic of Clearwater, FL*, Downloaded from www.visionic.com on Jun. 27, 2006.
"Beat rates per minute", downloaded from www.bpmlist.com on Jun. 27, 2006. *Lulu Publishing. ISBN 1-4116-4211-2*, (Jun. 27, 2006).
"Jukebox Without Quaters", *Business Opportunites Weblog*, www.business-opportunites.bix/2007/03/30/jukebox-without-quarters/, cited Mar. 30, 2007, printed (May 30, 2007),2 pages.
U.S. Appl. No. "11/551,702", filed Oct. 20, 2006, Rosenberg.
*Office Action from U.S. Appl. No. 11/298,797, dated Jan. 9, 2008 (3502.014)*.
U.S. Appl. No. "11/562,036", filed Nov. 21, 2006, Rosenberg.
U.S. Appl. No. "11/283,379", filed Aug. 17, 2006, Rosenberg.
U.S. Appl. No. "11/298,797", filed Aug. 3, 2006, Rosenberg.
U.S. Appl. No. "11/341,021", filed Aug. 3, 2006, Rosenberg.
U.S. Appl. No. "11/383,197", filed Aug. 31, 2006, Rosenberg.
Reinhold, Ross "Applications of Myers-Briggs Type Indicator, Personality Type", available at http://www.personalitypathways.com/ last visited Jun. 15, 2007.
"Human Metrics: Jung Typology Test", available at: http://www.humanmetrics.com/cgi-win/JTypes2.asp last visited Jun. 15, 2007.
U.S. Appl. No. "11/246,050", filed Feb. 8, 2007, Rosenberg.

U.S. Appl. No. "11/533,037", filed Sep. 19, 2006, Rosenberg.
U.S. Appl. No. "11/749,134", filed May 15, 2007, Rosenberg.
Rosenberg, Louis "Virtual Fixtures: perceptual Overlays Enchance Operator Performance in Telepresence Tasks", *Ph.D Dissertation, Stanford University*, (Jun. 1994).
Rosenberg, Louis "A force Feedback Programming Primer", *Immersion Corperation*, (1997).
"www.confluence.org", *first visit May 2005*.
U.S. Appl. No. "11/772,808", filed Jul. 2, 2007, Rosenberg.
U.S. Appl. No. "11/223,368", filed Sep. 9, 2005, Rosenberg.
U.S. Appl. No. "11/535,417", filed Sep. 26, 2006, Rosenberg.
Murray, et al., "Underwater Teleboticsa and Virtual Reality: A New Partnership", *NCCOSC RDT&E Division; Jun. 20, 1996; pp. 1-10; San Diego, CA*, 1-10.
U.S. Appl. No. "11/427,325", filed Jun. 28, 2006, Rosenberg.
U.S. Appl. No. "11/610,499", filed Dec. 13, 2006, Rosenberg.
U.S. Appl. No. "11/315,755", filed Dec. 21, 2005, Rosenberg.
U.S. Appl. No. "11/466,612", filed Nov. 16, 2006, Rosenberg.
U.S. Appl. No. "11/344,701", filed Jan. 31, 2006, Rosenberg.
U.S. Appl. No. "11/425,990", filed Jun. 22, 2006, Rosenberg.
Spohrer, "Information in Places", *IBM Systems Journal; 1999*; pp. 602-628; vol. 38, No. (1999),602-628.
U.S. Appl. No. "11/619,607", filed Jan. 3, 2007, Rosenberg.
U.S. Appl. No. "11/341,948", filed Jan. 27, 2006, Rosenberg.
U.S. Appl. No. "11/683,394", filed Mar. 7, 2008, Rosenberg.
U.S. Appl. No. "11/298,434", filed Dec. 9, 2005, Rosenberg.
U.S. Appl. No. "11/427,320", filed Jun. 28, 2006, Rosenberg.
McKinney and Moelants, et al., "Deviations from the Resonance Theory of Temp Induction", *published at the Conference on Interdiscoplinary Musicology*, et al = Dirk Moelands, (2004).
U.S. Appl. No. "11/626,355", filed Jan. 23, 2007, Rosenberg.
U.S. Appl. No. "11/223,368", filed Sep. 9, 2005, Rosenberg.
U.S. Appl. No. "11/610,615", filed Dec. 14, 2006, Rosenberg.
U.S. Appl. No. "11/267,079", filed Nov. 3, 2005, Rosenberg.
U.S. Appl. No. "11/285,534", filed Nov. 22, 2005, Rosenberg.
U.S. Appl. No. "11/533,037", filed Sep. 19, 2006, Rosenberg.
U.S. Appl. No. "11/749,134", filed May 15, 2007, Rosenberg.
U.S. Appl. No. "11/538,598", filed Oct. 6, 2006, Rosenberg.
U.S. Appl. No. 11/223,386, Rosenberg.
U.S. Appl. No. 11/267,079, Rosenberg.
U.S. Appl. No. 60/648,197, Rosenberg.
U.S. Appl. No. 60/665,291, Rosenberg.
U.S. Appl. No. 60/651,771, Rosenberg.
FreeDigiter: A Contact-free Device for Gesture Control; Christian Metzger; Matt Anderson; Thad Starner; IEEE 8th International Symposium on Wearable Computers; Nov. 4, 2004.
"Total Immersion", *D'Fusion Software, 2004*.
Anonymous, , "Social Search", Wikipedia.com Jan. 23, 2008.
Cigar, et al., "The magic wand", *In: Proceedings of Spring Conference on Computer Graphics 2003, Budmerice, Slovak Republic* 2003 , 132-8.
Finkelstein, Lev , "Placing Search in Context: The Concept Revisted", *Zapper Technologies* May 5, 2001.
Hernandez, Jose L. et al., "A New Instrumented Approach For Translatig American Sign Language Into Sound And Text", *IEEE International Confeence on Face and Gestures Recognition 2004, Seoul, Korea*, May 2004.
Hernandez-Rebollar, et al., "Multi-Class Pattern Recognition System for Practical Finger Spelling Translation", *Proceedings of International Conference on Multimodal Interfaces, IEEE 2002* , 185-190.
Kramer, J. et al., "The Talking Glove: Expressive and Receptive Verbal Communication Aid for the Deaf, Deaf-Blind, and Nonvocal", *SIGCAPH 39* Spring 1988, 12-15.
Sullivan, Danny , "Eurekster Launches Personalized Social Search", SearchEngineWatch.com Online Newsletter Jan. 24, 2004.

* cited by examiner

SYSTEM, METHOD AND COMPUTER PROGRAM PRODUCT FOR REJECTING OR DEFERRING THE PLAYING OF A MEDIA FILE RETRIEVED BY AN AUTOMATED PROCESS

CROSS-REFERENCE TO RELATED APPLICATIONS

This patent application is a non-provisional patent application claiming benefit and priority under 35 U.S.C. § 119(e) from applicant's co-pending U.S. provisional patent applications Ser. No. 60/648,197, filed on Jan. 27, 2005, Ser. No. 60/665,291 filed on Mar. 26, 2005 and Ser. No. 60/651,771 filed on Feb. 9, 2005. This patent application is a related patent application to co-pending U.S. non-provisional patent application Ser. No. 11/223,386 filed on Sep. 9, 2005 and Ser. No. 11/267,079 filed on Nov. 3, 2005. The aforementioned provisional and non-provisional patent applications, all to the instant inventor of record, are hereby incorporated by reference in their entirety as if fully set forth herein.

FEDERALLY SPONSORED RESEARCH AND DEVELOPMENT

Not Applicable

REFERENCE TO A MICROFICHE APPENDIX

Not Applicable

FIELD OF INVENTION

The present invention relates generally to automated media file selection, and more specifically to a system, method and computer program product for automatically selecting and playing of a media file from a pool of available media files and for enabling user responses using a supplemental user interface.

BACKGROUND

Electronic media players have become popular personal entertainment devices due to their highly portable nature and interconnectivity with existing computer networks, for example the Internet. The accessibility and simplicity in downloading music and other electronic media continues to fuel the popularity of these devices as is exemplified by Apple Computer, Inc.'s highly successful iPod™ portable media player. Other manufacturers have competing media players offering various functionalities and file playing compatibilities in an effort to differentiate their products in the marketplace.

As discussed in Apple Computer, Inc., patent application, US 2004/0224638 A1, Ser. No. 10/423,490 to Fadell, et al., which is herein incorporated by reference in its entirety; an increasing number of consumer products are incorporating circuitry to play musical media files and other electronic media.

For example, many portable electronic devices such as cellular telephones and personal digital assistants (PDAs) include the ability to play electronic musical media in many of the most commonly available file formats including MP3, AVI, WAV, MPG, QT, WMA, AIFF, AU, RAM, RA, MOV, MIDI, etc.

In the relevant art, portable media players lack the ability to correlate a user's activities, schedules, locations, motions, physiological and psychological states to select, suggest and/or automatically play a media file to enhance the user's listening and/or viewing experience. Users are therefore reliant on manual selections, a preestablished play list(s) or selections of others which do not take into account the many variables that affect a user's current preferences. For example, a user's preferences are highly variable based on the user's mood, scheduled events, current activity, seasonal changes, weather conditions, user listening preferences, physiological state, physiological state, locale and other variables which impact a user's musical preferences.

Therefore, a predictive mechanism that automatically performs media file selection and playing is a highly desirable feature for portable media players available in the relevant art.

In addition, a supplemental user interface which provides a simplified mechanism for users to reject or defer a currently playing media file selected by the aforementioned predictive mechanism is another highly desirable feature for implementation in portable media players available in the relevant art.

SUMMARY

The invention as described herein addresses the desirable aspects lacking in the relevant art, providing a predictive mechanism that automatically performs media file selection and playing and providing user interface mechanisms for enabling a user to quickly and easily accept, reject, and/or defer automatically selected media files. The present invention also provides mechanisms for storing information about user acceptances, rejections and/or deferrals of automatically selected media files as well as mechanisms for using such stored information to make future automatic media file selections having a greater likelihood of matching a user's personal preferences.

Various embodiments of the present invention perform predictive media file selection and playing by storing data accumulated over a period of time; the accumulated data being indicative of how a user's media file rejections or deferments correlate with chronographic information and/or provided sensor information to predictively select and play a current media file having an increased likelihood of matching the users then current media file preferences.

In addition, a simplified user interface is provided which allows for passive selection, and active deferral or rejection of a currently playing media file using simple user manipulations, gestures, or voice commands. For example, a dedicated push-button interface is disclosed that allows a user by pressing or not pressing the dedicated push-button upon a portable media player, to convey his or her acceptance, rejection, or deferral of a currently playing media file. Alternately, a head nod gesture interface is disclosed that allows the user to convey his or her acceptance, rejection or deferral of a currently playing media file by nodding his or her head in a characteristic positive or negative motion. The head nod gesture interface incorporates, one or more accelerometer sensors affixed to the headphones worn by the user or some other article worn by the user on the head such as glasses, a hair clip, an ear plug, or an ear bud.

The invention includes mechanisms to accumulate, for example, the time-of-day and/or day-of-week that a given media file is rejected or deferred by a user. This accumulated chronological information may be used by a predictive program for future media file selections to customize media file selections to the user's personal preferences.

Additionally, the time-of-day and/or day-of-week that a given media file was passively selected may also be stored in memory by various embodiments of the invention; which may be used by the predictive program for future media file selections.

For example, if the accumulated data indicates that a given media file has been rejected on numerous previous occasions, with the rejections occurring during the morning hours, and not rejected in the evening hours, the predictive program may select media files that more closely correspond to a users' media file preferences at a given time of day.

In various embodiments of the present invention, the media files are musical files that are played as audible music to users through headphones, speakers, and/or other audio output components. In such embodiments, a predictive program is operative to automatically select and play one or more musical files from a plurality of available musical files stored in a memory of the portable media player. Furthermore, in such embodiments the user interface of the present invention enables a user to quickly and easily accept, reject, and/or defer automatically selected musical files. In such embodiments the portable media player automatically selects and plays a music media file to the user who may optionally accept, reject, or defer the media file upon listening to a portion of it. One skilled in the art will appreciate the various electronic media file formats including video, audio and a combination thereof are possible in light of the teachings of the invention disclosed herein.

In a first systematic embodiment of the invention, a mechanism is provided for simplifying a rejection or deferral of automated media file selections.

The first systematic embodiment of the invention comprises; a portable media player having operatively installed therein a plurality of media files and a predictive program adapted to; automatically play one of the plurality of media files and automatically play another media file predictively selected from the plurality of media files upon receipt of at least a reject signal; and a first hardware device coupled to the portable media player and configured to transmit the reject signal to the predictive program.

A related embodiment of the invention provides a second hardware device coupled to the portable media player which is configured to transmit a defer command to the predictive program; whereby the predictive program is further adapted to automatically play another media file predictively selected from the plurality of media files upon receipt of the defer signal. In another related embodiment of the invention, one of the first and the second hardware devices is a push-button switch.

In a second systematic embodiment of the invention, another mechanism is provided for simplifying a rejection or deferral of automated media file selections.

This second systematic embodiment of the invention comprises; a portable media player having operatively installed therein; a plurality of media files, a predictive program adapted to automatically play one media file selected from the plurality of media files; automatically play another media file predictively selected from the plurality of media files upon receipt of a user's non-continued play decision; and store in a record the user's non-continued play decision in a format interpretable by the predictive program to at least suppress reselection of the one playing media file for a predetermined period of time.

Related systematic embodiments of the invention provides that the predictive selection process is determined at least in part on information stored in the record; the user's non-continued play decision comprises either the rejection or the deferral; the predetermined period of time is generally greater for the rejection than for the deferral; and the suppression prohibits reselection of the one playing media file by the predictive program before the predetermined period of time has expired.

In a third systematic embodiment of the invention, another mechanism is provided for simplifying a rejection or deferral of automated media file selections. The third systematic embodiment of the invention comprises; a processor; a main memory coupled to the processor; a communications infrastructure coupled to the processor; a secondary memory coupled to the communications infrastructure having retrievably stored therein a plurality of media files playable by the processor; one or more sensors operatively coupled to an interface; the interface being operatively coupled to the communications infrastructure and configured to transmit a signal received from the one or more sensors indicative of a user's non-continued play decision of the one media file; a predictive program stored in at least a portion of the main memory having instructions executable by the processor to; automatically play one media file selected from the plurality of media files retrieved from the secondary memory; and, automatically play another media file predictively selected from the plurality of media files upon receipt of the user's non-continued play decision.

Related systematic embodiments of the invention provides additional instructions executable by the processor to; record in a ambient influence information datastore at least the user's non-continued play decision; and determine the replacement media file based at least in part on the ambient influence information.

Additional related systematic embodiments of the invention provides that; the user's non-continued play decision is time constrained until after the one media file begins playing; one or more of the sensors comprises at least one of an accelerometer, a motion sensor, a video camera, a microphone and a switch; the accelerometer being coupled to one of the portable media player and a set of headphones; the user's non-continued play decision comprises at least one of a gesture, a voice command and operation of a push-button switch; the user's non-continued play decision further comprises the user's subjective rating of the one media file; and the user's subjective rating is stored in the ambient influence information datastore.

In a first methodic embodiment of the invention, a mechanism is provided for simplifying a rejection or deferral of automated media file selections. The first methodic embodiment of the invention comprises; providing a predictive program adapted to; automatically play one media file predictively selected from a plurality of media files; automatically play another media file predictively selected from the plurality of media files upon receipt of a user's non-continued play decision; and store in a record associated with the one media file, the user's non-continued play decision in a format interpretable by the predictive program to at least suppress reselection of the one playing media file for a predetermined period of time.

Related methodic embodiments of the invention provides that; the predictive selection process includes reading of the record by the predictive program; the user's non-continued play decision comprises either the rejection or the deferral; the predetermined period of time is greater for the rejection than for the deferral; and the suppression prohibits reselection of the one playing media file by the predictive program before the predetermined period of time has expired.

In a second methodic embodiment of the invention, a mechanism is provided for simplifying a rejection or deferral of automated media file selections. The second methodic embodiment of the invention comprises; providing a predictive program adapted to; automatically play one media file predictively selected from a plurality of media files; automatically play another media file predictively selected from the plurality of media files upon receipt of at least a reject signal; and, providing a first hardware device coupled to the portable media player configured to transmit the reject signal to the predictive program.

Related methodic embodiments of the invention further comprise a second hardware device coupled to the portable media player configured to transmit a defer command to the predictive program, whereby the predictive program is further adapted to automatically play another media file predictively selected from the plurality of media files upon receipt of the defer signal; and at least one of the first and the second hardware devices is a push-button switch.

In a third methodic embodiment of the invention, a mechanism is provided for simplifying a rejection or deferral of automated media file selections. The third methodic embodiment of the invention comprises; providing one or more sensors coupled to a sensor interface; providing the sensor interface coupled to a processor associated with the portable media player where the sensor interface is configured to transmit a signal indicative of a user's non-continued play decision; providing a predictive program having instructions executable by the processor to; automatically play one of a plurality of media files retrieved from a memory associated with the processor; and automatically play another media file predictively selected from the plurality of media files upon receipt of the signal.

Related methodic embodiments of the invention further comprise providing instructions executable by the processor to; record in an ambient influence information datastore, the user's non-continued play decision; record in the ambient influence information datastore, the user's subjective rating of the one media file; determine the another media file based at least in part on the ambient influence information, whereby the user's non-continued play decision comprises one of a gesture, a voice command and operation of a push-button switch.

Various exemplary computer program product embodiments of the invention further comprises instructions executable by a processor for simplifying a rejection or deferral of automated media file selections. The computer program product is embodied in a tangible form comprising instructions executable by the processor associated with a portable media file player to; automatically play one media file selected from a plurality of media files predictively retrieved from a memory coupled to the processor; receive from one or more sensors coupled to the processor a signal indicative of a user's non-continued play decision of the one media file; and, automatically play another media file predictively selected from the plurality of media files upon receipt of the signal.

In a related computer program product embodiment of the invention, additional instructions executable by the processor are provided to record in a datastore the user's non-continued play decision.

In another related embodiment of the invention, the user's non-continued play decision comprises one of a gesture, a voice command and operation of a push-button switch.

The tangible form of the computer program product comprises magnetic media, optical media or logical media.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. Optional components or feature are generally shown in dashed or dotted lines. It is intended that changes and modifications can be made to the described embodiment without departing from the true scope and spirit of the subject invention as defined in the claims.

DETAILED DESCRIPTION

The invention provides a system, method and computer program product which automatically selects and plays a media file on a portable media player in optional dependence on at least one or more sensor signal(s) and/or timing circuits and/or stores of media file specific information. A simplified user interface arrangement is also provided which allows a user to minimize interactions with the portable media player when an acceptable or unacceptable media selection is automatically played to the user. Systems, methods, and computer program products are also provided for collecting and storing information related to user acceptances, rejections, and/or deferrals of automatically selected media files selections and for using such stored information to make future media files selects that have an increased likelihood of matching the user's then current media preferences. Where necessary, computer programs, algorithms and routines are envisioned to be programmed in a high level language object oriented language, for example, Java™ C++, C#, C or Visual Basic™.

Figure 1:
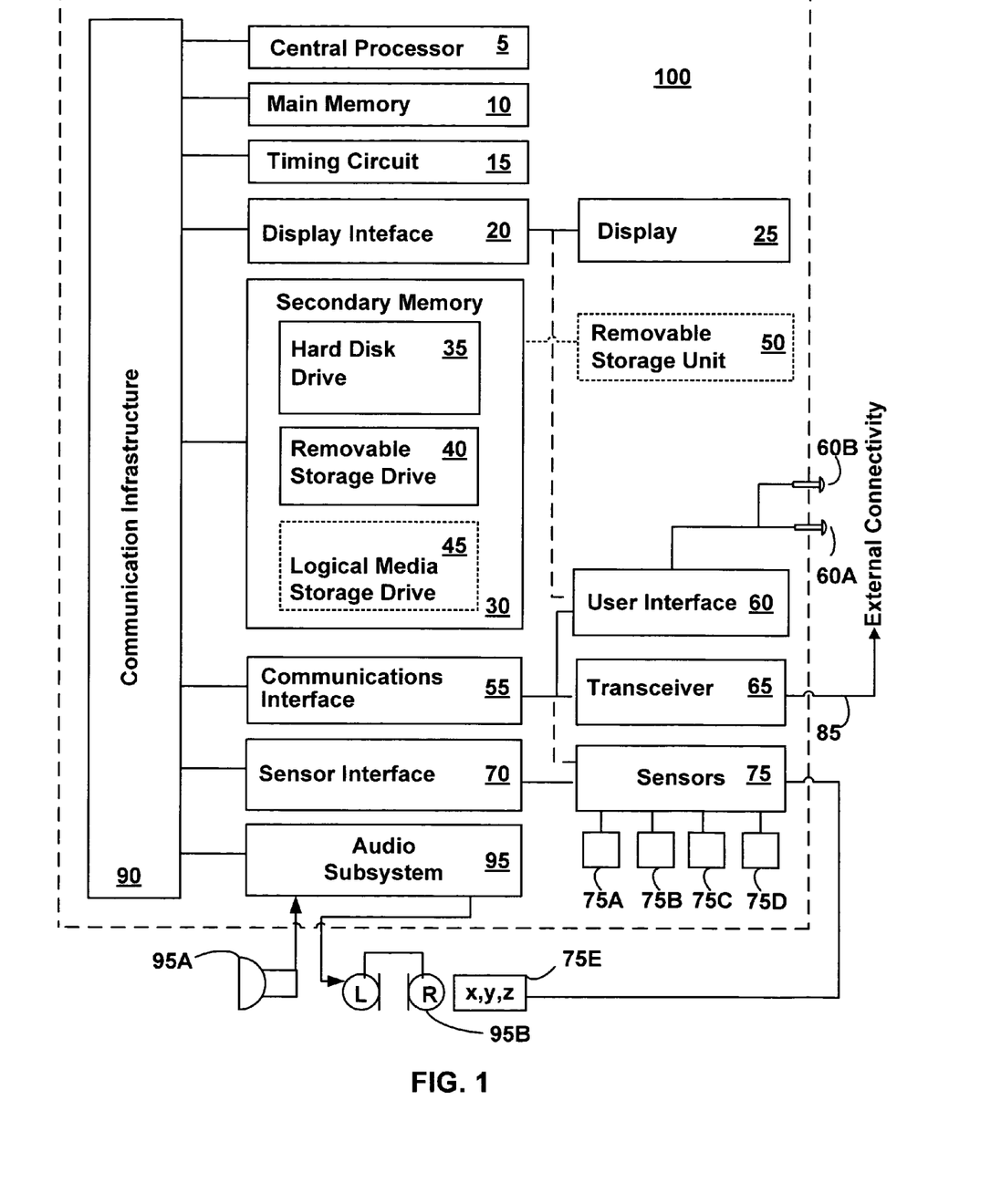
FIG. 1—depicts a generalized block diagram of a portable media player.

Referring to FIG. 1, a generalized block diagram of a portable media player 100 is depicted. The portable media player 100 includes a communications infrastructure 90 used to transfer data, memory addresses where data files are to be found and control signals among the various components and subsystems associated with the portable media player 100. A central processor 5 is provided to interpret and execute logical instructions stored in the main memory 10. The main memory 10 is the primary general purpose storage area for instructions and data to be processed by the central processor 5. The term "main memory" 10 is used in its broadest sense and includes RAM, EEPROM and ROM.

A timing circuit 15 is provided to coordinate activities within the portable media player in near real time. The central processor 5, main memory 10 and timing circuit 15 are directly coupled to the communications infrastructure 90.

A display interface 20 is provided to drive a display 25 associated with the portable media player 100. The display interface 20 is electrically coupled to the communications infrastructure 90 and provides signals to the display 25 for visually outputting both graphical displays and alphanumeric characters.

The display interface 20 may include a dedicated graphics processor and memory to support the displaying of graphics intensive media. The display 25 may be of any type (e.g., cathode ray tube, gas plasma) but in most circumstances will usually be a solid state device such as liquid crystal display.

A secondary memory subsystem 30 is provided which houses retrievable storage units such as a hard disk drive 35, a removable storage drive 40, an optional logical media storage drive 45 and an optional removal storage unit 50. One skilled in the art will appreciate that the hard drive 35 may be replaced with flash memory.

The removable storage drive 40 may be a replaceable hard drive, optical media storage drive or a solid state flash RAM device. The logical media storage drive 45 may include a flash RAM device, an EEPROM encoded with playable media, or optical storage media (CD, DVD). The removable storage unit 50 may be logical, optical or of an electromechanical (hard disk) design.

A communications interface 55 subsystem is provided which allows for standardized electrical connection of peripheral devices to the communications infrastructure 90 including, serial, parallel, USB, and Firewire™ connectivity. For example, a user interface 60 and a transceiver 65 are electrically coupled to the communications infrastructure 90 via the communications interface 55. For purposes of this specification, the term user interface 60 includes the hardware and operating software by which a user interacts with the portable media player 100 and the means by which the portable media player conveys information to the user and may include the display interface 20 and display 25.

The transceiver 65 facilitates the remote exchange of data and synchronizing signals between the portable media player 100 and other devices in processing communications 85 with the portable media player 100.

The transceiver 65 is envisioned to be of a radio frequency type normally associated with computer networks for example, wireless computer networks based on BlueTooth™ or the various IEEE standards 802.11$_x$, where x denotes the various present and evolving wireless computing standards, for example WiMax 802.16 and WRANG 802.22. Alternately, digital cellular communications formats compatible with for example GSM, 3G, CDMA, TDMA and evolving cellular communications standards. Both peer-to-peer (PPP) and client-server models are envisioned for implementation of the invention. In a third alternative embodiment, the transceiver 65 may include hybrids of computer communications standards, cellular standards and evolving satellite radio standards.

The user interface 60 employed on the portable media play 100 may include a vibratory unit (not shown); a pointing device (not shown) such as a mouse, thumbwheel or track ball, an optional touch screen (not shown); one or more push-button switches 60A, 60B; one or more sliding or circular rheostat controls (not shown) and one or more other type switches (not shown.)

The user interface 60 provides interrupt signals to the processor 5 that may be used to interpret user interactions with the portable media player 100 and may be used in conjunction with the display interface 20 and display 25. One skilled in the art will appreciate that the user interface devices which are not shown are well known and understood.

A sensor interface 70 is provided which allows one or more sensors 75 to be operatively coupled to the communications infrastructure 90. The sensor interface 70 may monitor interactions with the user interface 60. For example, the sensor interface 70 may be used to monitor a user's interaction with the one or more push-button switches 60A, 60B. An interrupt circuit may be incorporated into the hardware supporting the communications infrastructure 90, sensor interface 70, user interface 60, and/or audio subsystem 95.

A portion of the sensors 75A, 75B, 75C, 75D may be installed within the case (not shown) housing the portable media player 100. Alternately, one or more sensors 75E may be peripheral to the portable media player 100 and coupled to the sensor interface 70 by an external jack 75C or wireless arrangement which utilizes the transceiver 65.

A wide range of real time and near real time sensor types are envisioned to be connectable to the portable media player 100; examples of which includes meteorological sensors, physiological sensors, navigational sensors, geo-spatial sensors, motion sensors, inclination sensors, environmental sensors, and a combination thereof.

The term "sensors" as defined herein is a device that detects or measures something by converting non-electrical energy to electrical energy.

As examples, a photocell converts light energy into electrical energy; a video camera converts varying light energy into electrical energy; an accelerometer converts mechanical energy into electrical energy; and a timing circuit converts mechanical vibrations of a reference crystal into electrical energy. The sensors 75A, 75B, 75C, 75D, 75E provide their data to the processor 5 via the sensor interface 70 coupled to the communications infrastructure 90. Lastly, an audio subsystem 95 is provided and electrically coupled to the communications infrastructure 90.

The audio subsystem provides for the playback and recording of digital media, for example, multi or multimedia encoded in any of the exemplary formats MP3, AVI, WAV, MPG, QT, WMA, AIFF, AU, RAM, RA, MOV, MIDI, etc. The audio subsystem includes a microphone input port 95A for input of voice commands and a headphone, headset, ear buds or speaker output 95B. Connection of the microphone 95A and/or headphones 95B includes both traditional cable and wireless arrangements such as BlueTooth™ are known in the relevant art. As referred to in this specification, "media" refers to video, audio, streaming and any combination thereof.

In addition, the audio subsystem is envisioned to optionally include features such as graphic equalization, volume, balance, fading, base and treble controls, surround sound emulation, and noise reduction. One skilled in the art will appreciate that the above cited list of file formats is not intended to be all inclusive.

The portable media player 100 includes an operating system, the necessary hardware and software drivers necessary to fully utilize the devices coupled to the communications infrastructure 90, media playback and recording applications and at least one predictive program 240 (FIG. 2) operatively loaded into the main memory 10.

The at least one predictive program 240 (FIG. 2) is programmed to monitor the sensor data 75 collected from the one or more of the sensors 75A, 75B, 75C, 75D, 75E and chronographic information received from one or more timing circuits 15 to determine correlations between a user's media file selection preferences, sensor signals and/or other chronographic information under a given set of circumstances.

References to the at least one predictive program 240 (FIG. 2) may be made in both singular and plural form. No limitation is intended by such grammatical usage as one skilled in the art will appreciate that multiple programs, objects, subprograms routines, algorithms, applets, contexts, etc. may be implemented programmatically to implement the various embodiments of the invention. Further detailed discussions of the at least one predictive program 240 are provided in U.S.

patent applications Ser. No. 60/651,771 filed on Feb. 9, 2005 and Ser. No. 11/267,079 filed on Nov. 3, 2005 to the instant inventor, both patent applications are herein incorporated by reference in their entirety.

Optionally, the portable media player 100 is envisioned to include at least one remote authentication application, one or more cryptography applications capable of performing symmetric and asymmetric cryptographic functions, and secure messaging software (not shown.)

The present invention includes various distinct inventive arrangements that enable a portable media player to select and automatically play a media file that is more likely to be preferred by the user than a media file selected purely at random.

Figure 1A:
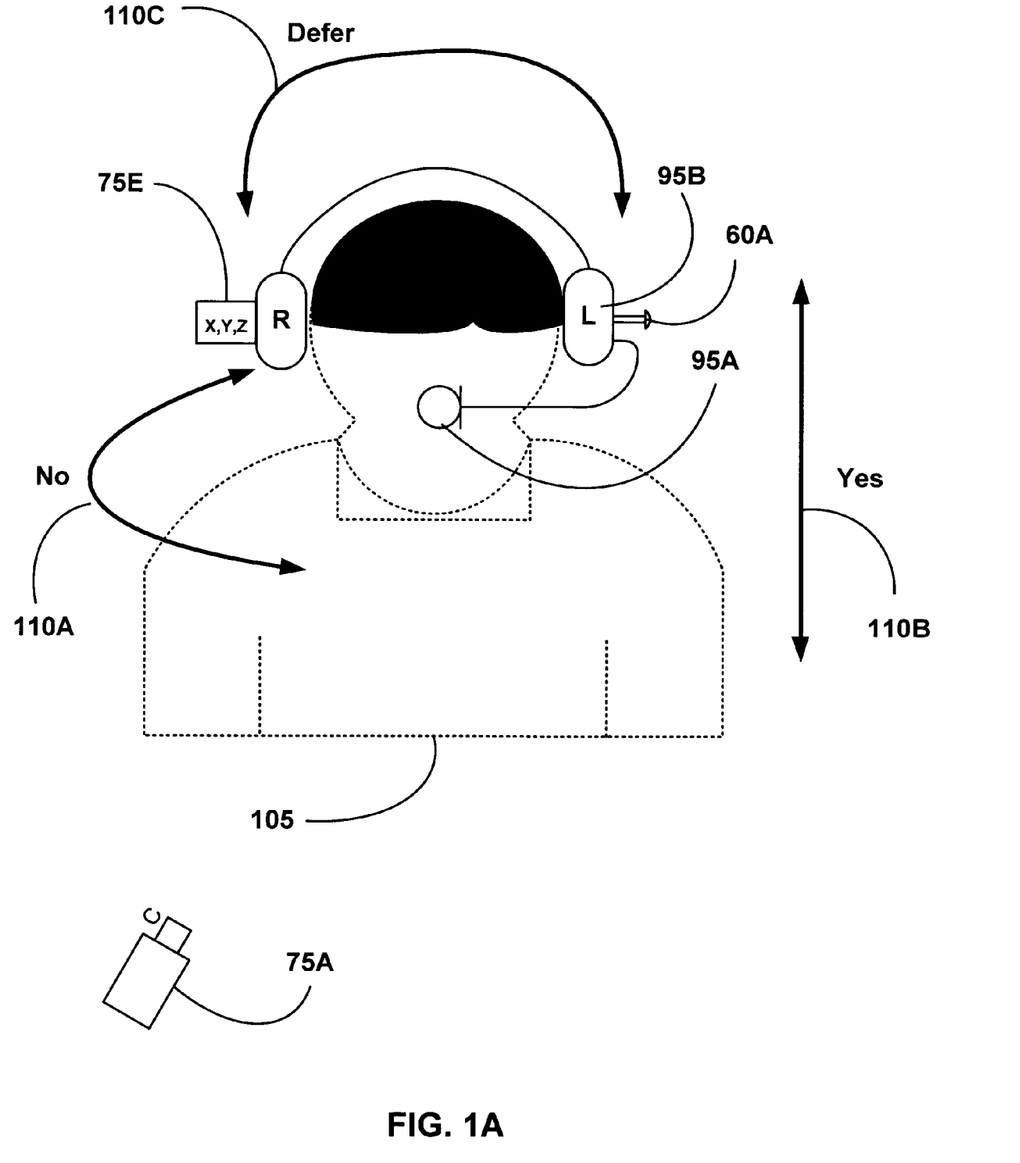
FIG. 1A—depicts an embodiment of the invention in which one or more sensors are provided to signal a user's media file preference.

Referring to FIG. 1A, the user interface 60 may also include one or more push-button switches 60A specifically configured for a rejection of the currently playing media file. For example, the user interface 60 could include a large push-button switch 60A physically located on the media player 100 or incorporated into the set of headphones 95B.

If the user depresses the push-button switch 60A, a currently playing media file will terminate play and a replacement media file will selected and automatically begin playing. In this way, the user may easily reject media files that are suggested by the predictive program 240 (FIG. 2) that does not reflect the users' current preferences.

The push-button switch 60A may be configured as a momentary switch, rocker, lever, or other switch arrangement associated with the case of the media player 100 or incorporated into the headphones 95B.

Alternately, or in addition thereto, other user interface 60 arrangements are envisioned which allow the rapid selection, rejection or deferral of a currently playing media file. In one embodiment of the invention, a head nod gesture interface 75E is provided which detects characteristic head motions, such as the left-right-left and/or right-left-right head motion that are indicative of a negative head nod 110A, up/down which is indicative of an acceptance 110B, or side to side 110C which is indicative of a deferral of the currently playing media file.

The motion sensor 75E may be an accelerometer affixed to the headphones 95B worn by the user 105 or an inclinometer 75B. In another embodiment of the invention, the user interface 60 may utilize a video camera 75A to capture a simple hand gesture, head gesture or body gesture to signal a user's preference regarding the currently playing media file.

For example, the video camera 75A may be aimed at the user 105 and provides images to an image processing software; the image processing software being configured to at least detect characteristic left-right-left, or right-left-right head motion gestures indicative of a negative head nod 110A. A negative head nod interpreted by the image processing software as indicia of a rejection of the currently playing media file by a user.

Analogously, the video camera 75A may be aimed at the user 105 which provides images to the image processing software for detecting other body gestures, such as a classic thumbs-down hand gesture, the thumbs-down hand gesture interpreted by the image processing software as a rejection 110A of the currently playing media file.

To limit processing impacts and erroneous selections, the sensor interface 70 may constrain collection of data received by the motion, switches or image sensors 75E, 60A, 60B, 75A to a certain time period after the media file begins playing, for example during the first 20 seconds.

In most instances, acceptance of the playing media file is presumed (i.e., a default value) unless a rejection 110A or deferral signal 110C is received within the constrained time period if applicable; the presumptive acceptance thereby reducing required user interactions with the media player 100.

In another embodiment of the invention, an accelerometer 75E and/or an inclinometer 75B is affixed to the portable media player 100 itself. In this way, selection, rejection or deferral of media files could be accomplished by the user 105 simply by tapping or striking the media player 100 in a characteristic way. Note, that for inventive embodiments that employ an accelerometer 75E and/or an inclinometer 75B affixed to the media player 100, the sensors 75 may be used for additional functions beyond the selection, rejection or deferral of media files as described above. For example the accelerometer 75E and/or inclinometer 75B could be used as a user interface 60 for scrolling and/or selecting visually displayed 25 menu selections upon the portable media player 100 when the user 105 is in a manual media file selection mode.

In this way, the user 105 could scroll through a visual list of media files by simply tilting the media player 100 in a given direction. For example, if the user 105 tilts the media player 100 such that the top face is angled downward, the menu list scrolls backward. Analogously, if the user 105 tilts the media player 100 such that the top face is angled upward, the menu list scrolls forward. Additionally, the user interface 60 could be configured to include left-right tilting of the media player 100. For example, tilting the media player 100 to the left, the list scrolls leftward, tilting the media player 100 to the right and the list scrolls rightward. One skilled in the art will appreciate that the user interface commands could be reversed so that the tilt orientations have the opposite effect.

In another embodiment of the invention, a microphone 95A and voice recognition software may be implemented to detect a vocal command that triggers the selection, rejection or deferral of a currently playing media file. For example, a microphone 95A attached to the headset 95B or media player 100 supplies user voice commands to the voice recognition software; the voice recognition software being configured or trained to detect one or more characteristic words or phrases uttered by the user 105 as commands for selecting, rejecting or deferring a currently playing media file.

In a related embodiment of the invention, the characteristic words or phrases may be customized by the individual user 105 to whatever he or she desires.

For example, typical words include but are not limited to "accept", "reject" or "defer." Other commands which may incorporate a subjective rating such as "pass", "next", "later", "lame", "postpone", "junk", "keep", "delete," "trash," "cool", "rad" "awesome," etc. may be configured as well. Note the user 105 may configure his or her media player 100 to respond to a plurality of different verbal commands, allowing the user to experience enjoyment using difference words and or phrases to select, reject or defer a currently playing media file. Also note that the voice recognition software can optionally include a calibration step in which the voice recognition software is trained by a user 105 (or users) uttering the select words and/or phrases.

Figure 2:
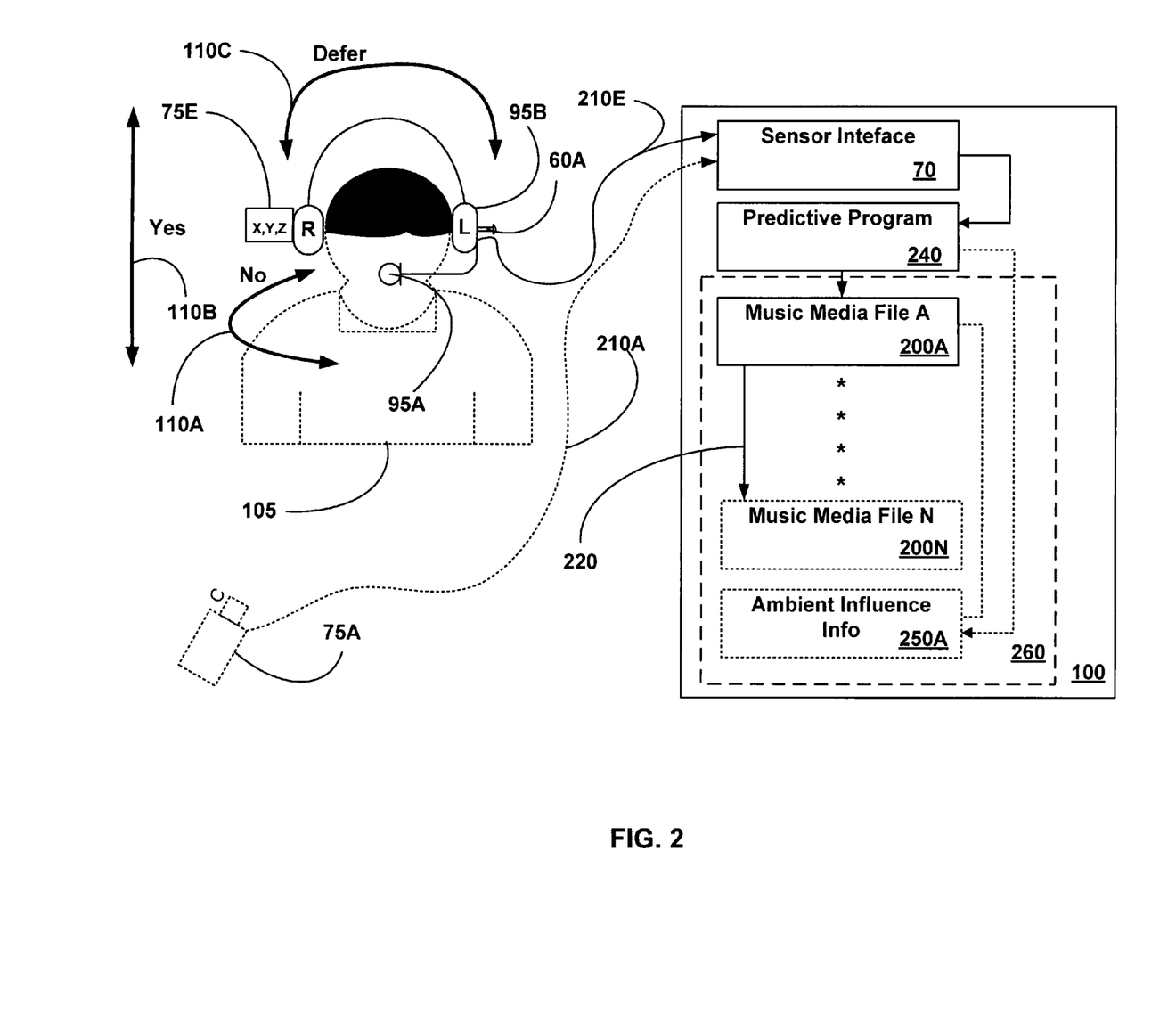
FIG. 2—depicts an embodiment of the invention in which a predictive application is automatically selecting, retrieving and playing a media file in dependence on the signal(s) received from one or more of the sensors.

FIG. 2 depicts an exemplary embodiment of the invention where the predictive program 240 is receiving sensor signals 75 from a headset mounted accelerometer 75E and/or optionally from a video camera 75A or microphone 95A. The sensor signals 75 are interpreted by the sensor interface 70 to provide interrupts to the predictive program 240 indicating a user's non-continued play decision of the currently playing media file 200A. As previously described, acceptance of the playing media file 200A is presumed (i.e., a default value) unless a rejection 110A or deferral signal 110C is received within a constrained time period where applicable.

The predictive program 240 interprets the rejection or deferral command and predictively selects 220 another media file 200N from the plurality of media files retrievably stored in the datastore 260. The retrieved media file 200N is loaded into memory 10 and begins playing. Ambient influence information 250A associated with the rejected or deferred media file 200A may be updated to reflect the user's recent preference and chronological information 15.

Storage of the ambient influence information 250A may be accomplished in a datastore 260 by many common arrangements. For example, the data structure shown below may be used to maintain the accumulated historical data.

In this exemplary data structure, a unique identifier ID is associated with each media file stored in the datastore 260; where n is a value between 0 and N, representing the ambient influence information specific to a particular recorded parameter and N representing the maximum number of sets of recorded data points to be maintained. One skilled in the art will appreciate that the data structure for storing the accumulated historical data may take a variety of forms.

Example Data Structure

Ambient_Influence_Information.time_of_day[ID,n]
Ambient_Influence_Information.day_of_week[ID,n]
Ambient_Influence_Information.no_selections[ID,n]
Ambient_Influence_Information.no_rejections[ID,n]
Ambient_Influence_Information.no_deferrals [ID,n]

In various embodiments of the invention, each set of n historical accumulations of historical data for each media file may be used by the predictive program 240 to determine and maintain a statistical measure of a central tendency for each recorded historical parameter (e.g., time of day, number of deferrals, and/or number of rejections.) This may be accomplished for example, by using simple statistical mean and standard deviation(s) across the total number N of accumulated historical ambient factors for each unique identifier associated with a media file.

Alternatively, for example, this may be accomplished by performing a frequency distribution analysis across the total number N of accumulated historical parameters where the recorded parameter data is processed to determine which parameter values or ranges of parameter values occur with the highest frequency in the set of historical data stored in the datastore 260. For example, N=20 historical time of day values may be stored for a media file of ID=1213. A frequency distribution analysis may be performed on the 20 data points to determine which ranges of times of day occur most frequently in the accumulated historical data.

In another example, the analysis may be performed using predefined ranges of Midnight-4 AM, 4 AM-8 AM, 8 AM-Noon, Noon-4 PM, 4 PM-8 PM, and 8 PM to Midnight. Each of these ranges is generally called a bin. The analysis is performed by sorting each of the 20 time-of-day values into their respective bins and then determining what frequency the results fall into each bin.

In this example, a particular user may have selected a particular media file with ID=1341 at times of day in the past where 18 of the 20 time of day values stored in the datastore fall within the 8 PM to Midnight time range bin. Thus the frequency would be 18/20 or 90% of the time this media file was selected by the user during this time of day range, thereby providing a statistical correlation between the user's preference to that particular media file and the time of day.

In this way, the ambient influence information 250A contained in the datastore 260 maintains statistical correlations between its associated media file 200A based on correlations made with one or more sensor data inputs 75 and a user's preference for that particular media file 200A.

One skilled in the art will appreciate that the storage and use of ambient influence information for the predictive selection of individual media files may be implemented for individual media files, albums, artists, and genres.

Figure 2A:
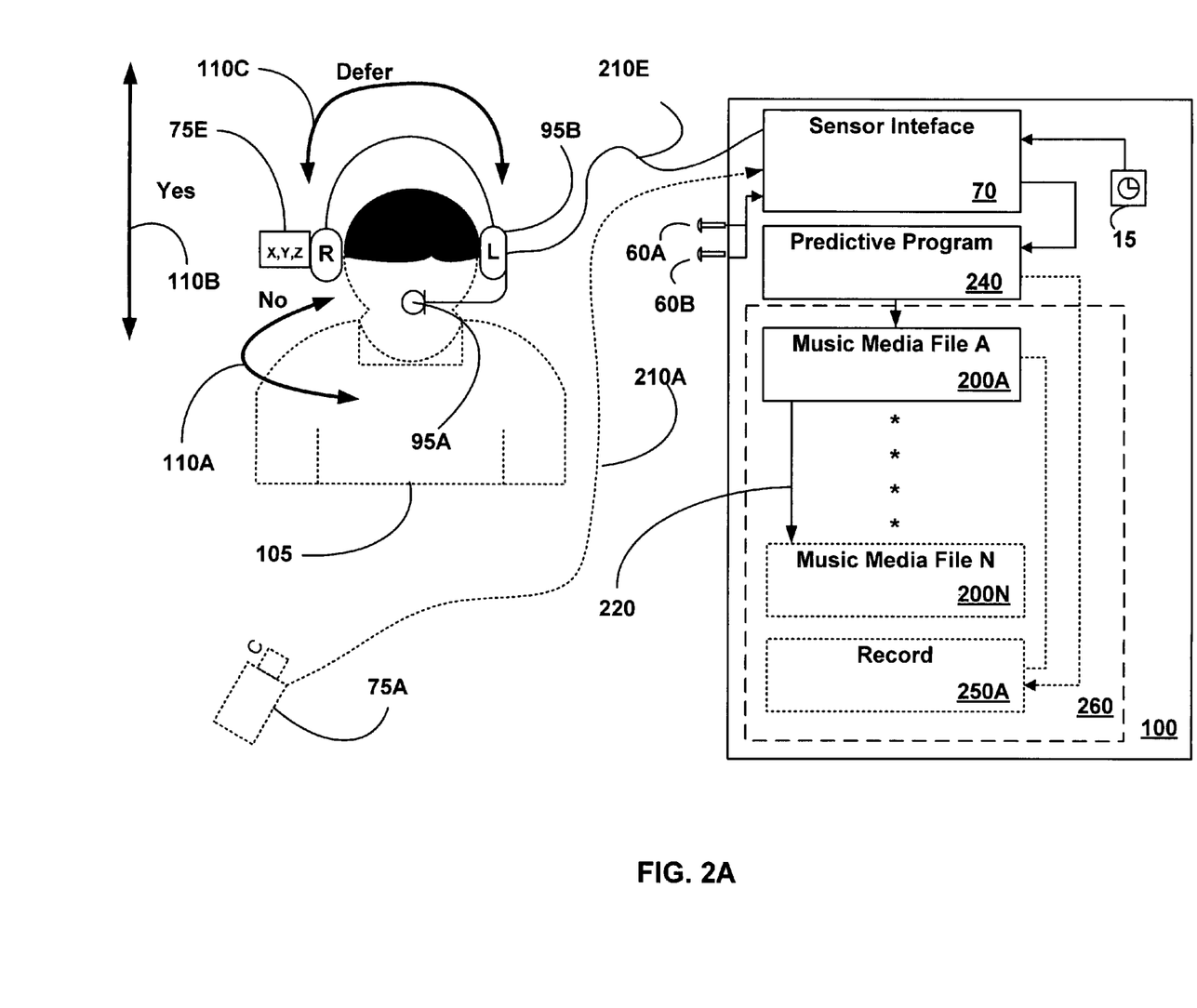
FIG. 2A—depicts another embodiment of the invention in which a predictive application is automatically selecting, retrieving and playing a media file in dependence on one or more push-button switches.

FIG. 2A depicts various embodiments of the invention where one or more specifically configured push-button switches 60A, 60B are provided on the media player 100. In one embodiment of the invention, a push-button switch is 60A is specifically configured for rejecting a currently playing media file 200A automatically selected by the predictive program 240. In another embodiment of the invention, a second push-button switch 60B is specifically configured for deferring a currently playing media file 200A automatically selected by the predictive program 240. The difference between a rejection and a deferral may be based on a predetermined amount of time 15 before which the rejected or deferred media file may be automatically selected again by the predictive program. For example, a rejected media file 200A generally has a longer time period than a deferred media file 200A before a such a media file 200A would be available again for selection by the predictive program 240. For example, in an embodiment of the present invention, the hardware and software is configured such that a rejected media file is not available for automatic selection by the predictive program for a predetermined time 15 of twenty-four hours while a deferred media time is not available for automatic selection by the predictive program for a predetermined time of sixty minutes. In this way, a rejection has a substantially different effect upon future media file selections than a deferral.

The predetermined amount of time for a deferral or rejection may be configured as a default value [hour, day, week, month], user defined parameter, or may be determined automatically by the predictive program based upon a historical analysis of past user behavior.

There are numerous methods by which a media file may be removed from the pool of available media files that are considered by the predictive program for a period of time upon a rejection or deferral by the user. In many such embodiments, a data structure is created in memory for each media file and is populated with data indicative of any recent rejection and/or deferral of that media file along with a time stamp information indicating the time at which the rejection or deferral was imparted by the user. Using such a data structure, the predictive program may be configured to suppress any media files for automatic selection for a period of time following each rejection or deferral of that media file. In general, the period of time is longer for a rejection than a deferral as described above.

In another inventive embodiment, the software of the present invention may record a state value of 0 for not rejected or deferred; or a state value of 1 for rejected or deferred along with a timestamp having hourly resolution. In this example, the predictive program would only select a media file A 200A having a 0 state(s) for a given time.

| Media File A 200A - Rejection Case + 24 hours | | |
|---|---|---|
| Time | State (Reject) | State (Defer) |
| 1000-1100 | 0 | 0 |
| 1100-1200 | 1 | 0 |
| 1300-1400 | 1 | 0 |
| * | | |
| * | | |
| * | | |
| 1000-1100 | 1 | 0 |
| 1100-1200 | 0 | 0 |
| | | (Available for selection) |
| 1300-1400 | 0 | 0 |

In this example, a rejection removes media file A 200A from the selection pool of media files 200N for twenty-four hours as shown above; alternately, a deferral may only remove media file A 200A from the selection pool of media files N 200N for one hour as shown below. (The twenty-four and one hour suppression intervals are provided arbitrarily for example purposes.)

| Media File A 200A - Deferral Case + 1 hour | | |
|---|---|---|
| Time | State (Reject) | State (Defer) |
| 1000-1100 | 0 | 1 |
| 1100-1200 | 0 | 1 |
| 1300-1400 | 0 | 0 |
| | | (Available for selection) |

Alternately, a counter value could be used in which the state remains 1 rejected or deferred until a counter value is exceeded. For example, a counter value (t) could be incremented each time the user turns on the media player 100. A rejection could be configured, for example, to require three power-on sessions before media file A 200 is available.

| Media File A 200A - Rejection Case + 3 Power-on Sessions | | |
|---|---|---|
| Counter Value | State (Reject) | State (Defer) |
| 2000 | 1 | 0 |
| 2001 | 1 | 0 |
| 2002 | 1 | 0 |
| 2003 | 1 | 0 |
| 2004 | 0 | 0 |
| | | (Available for selection) |

Analogously, a deferral would only require one power-on session before media file A 200A is available from the pool of selectable media files N 200N.

| Media File A 200A - Deferral Case + 1 Power-on Sessions | | |
|---|---|---|
| Counter Value | State (Reject) | State (Defer) |
| 2000 | 0 | 1 |
| 2001 | 0 | 1 |
| 2002 | 0 | 0 |
| | | (Available for selection) |
| 2003 | 0 | 0 |
| 2004 | 0 | 0 |

A general expression for a power-on, timer or equivalent function is $Counter\_value(t) + Suppress\_value > Counter\_value(c)$; where $Counter\_value(t)$ is the counter value at the time the rejection or deferral was made; $Suppress\_value$ is the number of power-on sessions; and $Counter\_value(c)$ is the current counter value.

In another related embodiment of the invention, the predictive program may be configured to count the number of automatic media file selections made by the predictive program over time and remove a rejected or deferred media file for a predetermined number of future selections made. For example, a rejected media file may be removed from the automatic selection process for a counter period corresponding to the next fifty automatic selections made by the predictive program while a deferred media file may be removed form the automatic selection process for a counter period corresponding to the next five automatic selections made. In this way a user can be assured that a rejected media file will not be played again for a long time (i.e. until 50 different media files are played at the earliest) and a deferred media file will not be played again for a shorter time (i.e. until 5 different media files are played at the earliest.)

In another related embodiment of the invention, the predictive program 240 automatically starts play of media file A 200A in which the user rejects or defers reselection of media file A 200A. The rejection or deferral is recorded 250A in memory 10, 30 or a datastore 260 which is then used by the predictive program 240 to suppress reselection of media file A 200A for a given time or counter period 15 as described in the examples provided above.

A long-term history may be recorded 250A by the predictive program 240 that indicates the number of times a media file is rejected or deferred over a period of weeks or months. If the media file is rejected or deferred often during some time period, the suppression duration may be increased automatically based on statistical measures and/or another heuristically devised mechanism.

Alternately or in conjunction therewith, the user 105 may enter default values in a set-up menu for the amount of time 15 (or other suitable dependencies,) that the media file will be suppressed from the available pool of selectable media files upon a rejection and/or a deferral. For example, a media file 200A could be suppressed from the selection pool for the next ten media file selections before being returned to the pool 200N as defined by a user setup menu or configuration file Finally, it should be noted that in some embodiments of the present invention a rejected or deferred media file may not be removed from the selection pool for a period of time but instead have its probability of selection significantly reduced for a period of time. In this way the statistical chances that the rejected or deferred media file is reduced for a period of time following a rejection or deferral, but is not completely eliminated.

Figure 3:
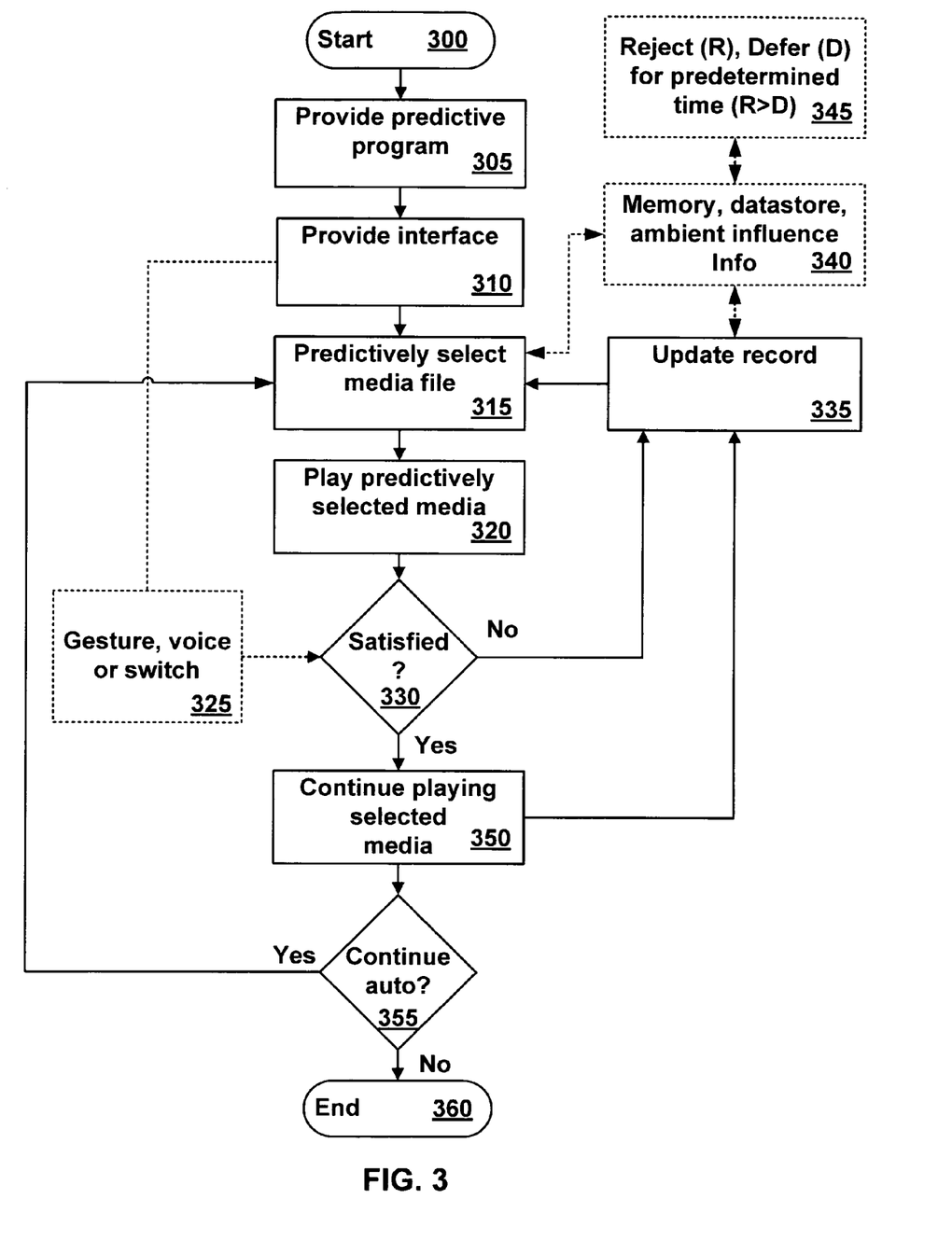
FIG. 3—depicts a first flow chart of an embodiment of the invention in which the predictive application is automatically selecting, retrieving and playing a media file in dependence on the signal(s) received from one or more of the sensors.

Referring to FIG. 3, a flow chart is provided which depicts the process for implementing an embodiment of the invention. The process is initiated 300 by providing at least one predictive program 305 executable by a processor associated with a portable media player into the main memory of the portable media player 330. The predictive program receives sensor signals provided by an interface coupled to the processor via a communications infrastructure 310. A predictively selected media file is automatically selected and retrieved from a memory, or a datastore 340 by the at least one predictive program 315 and begins playing to a user 320.

If the user is not satisfied with the currently playing media file 330, a rejection or deferral signal using a gesture, voice command or push-button switch 325 is sent by way of the sensor interface to the at least one predictive program 330. A record associated with the rejected or deferred media file 340 may be updated to reflect a negative association between the current sensor inputs and the rejected or deferred media file 335. The record is maintained in a memory, datastore or as part of ambient influence information 340.

Various embodiments of the invention provides for a rejection R which suppresses selection of the media file for a predetermined time period generally greater than that of a deferral D 345 where R>D 345, as described in the discussion provided for FIG. 2A.

The ambient influence information 340, if maintained by a particular embodiment of the invention, may be updated to reflect any rejection or deferral by correlating the rejection or deferral with current chronographic and/or sensor data collected at the current time. Additional details on such a correlation process are provided in U.S. patent application Ser. No. 11/267,079 filed on Nov. 3, 2005 to the instant inventor, the patent application herein incorporated by reference in its entirety. In this way the correlation between the current sensor inputs and/or chronographic data and the rejected media file is weakened, decreasing the chance that the rejected or deferred media file will be reselected under similar conditions in the future. The at least one predictive program repeats the process 315-345 until the user is satisfied with the currently playing media file 330.

Once the user is satisfied 330 with the currently playing media file, no user interaction is required and the selected media file continues playing to the user 350.

The record associated with that accepted media file may be updated 335 to reflect a positive association between any collected sensor data and/or chronographic data and the accepted media file. Additional details on such a correlation process are provided in U.S. patent application Ser. No. 11/267,079 filed on Nov. 3, 2005 to the instant inventor, the patent application herein incorporated by reference in its entirety. In this way, the correlation between the current sensor inputs and/or chronographic data and the accepted media file is strengthened, increasing the chance that the accepted media file will be reselected under similar conditions. If the user desires to end automated media file selection 355, the user turns off the automated feature via a user interface 60 coupled to the communications infrastructure 90 which ends the process 360. Alternately, if the user desires to continue 355 the automated media file selection; the process repeats 315-345 as described above.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks.

No specific limitation is intended to a particular security system or financial services system. Other variations and embodiments are possible in light of above teachings, and it is not intended that this Detailed Description limit the scope of invention, but rather by the Claims following herein.

What is claimed:

1. A hands-free user-interface system for a portable media player device, comprising:
    an accelerometer being functionally coupled to a user's head and being configured to generate a motion signal in response to a user-imparted head motion; and
    a portable media player device, the device comprising a predictive program,
    the device being in electronic communication with the accelerometer via the predictive program, and
    the device, via the predictive program, being capable of playing a plurality of media files to a user, of receiving the motion signal, and of selectively rejecting a currently playing media file of the plurality of media files based on a determination that the motion signal indicates a characteristic negative head-nod gesture by the user,
    wherein the device is capable of ceasing playing the selectively rejected media file, and
    whereby a current play of a selectively rejected media file is ceasable by the device.

2. The user-interface of claim 1, wherein the characteristic negative head-nod gesture comprises at least one motion selected from a group consisting essentially of a substantially right-left-right head motion and a substantially left-right-left head motion.

3. The user-interface of claim 1, wherein the accelerometer is functionally coupled with the user's head by way of at least one element selected from a group consisting essentially of a pair of headphones and a pair of earbuds, the at least one element being worn by the user.

4. The user-interface of claim 1, wherein the device comprises integrated hardware and software.

5. The user-interface of claim 1, wherein the device ceases playing the currently playing media file only if the characteristic negative head-nod gesture is imparted during an initial time period following inception of playing the currently playing media file.

6. The user-interface of claim 5, wherein the initial time period comprises a range of approximately 20 seconds.

7. The user-interface of claim 1, wherein the device is capable of playing the currently playing media file in response to an automated media selection feature.

8. The user-interface of claim 1,
    wherein the characteristic negative head-nod gesture comprises at least one motion selected from a group consisting essentially of a substantially right-left-right head motion and a substantially left-right-left head motion,
    wherein the accelerometer is functionally coupled with the user's head by way of at least one element selected from a group consisting essentially of a pair of headphones and a pair of earbuds, the at least one element being worn by the user,
    wherein the device comprises integrated hardware and software,
    wherein the device ceases playing the currently playing media file only if the characteristic negative head-nod gesture is imparted during an initial time period following inception of playing the currently playing media file,
    wherein the initial time period comprises a range of approximately 20 seconds, and
    wherein the device is capable of playing the currently playing media file in response to an automated media selection feature.

9. A method of fabricating a hands-free user-interface system for a portable media player device, comprising the steps of:
    providing an accelerometer being functionally coupled to a user's head and being configured to generate a motion signal in response to a user-imparted head motion; and
    providing a portable media player device, the device providing step comprising providing a predictive program,
    the device providing step comprising providing the device being in electronic communication with the accelerometer via the predictive program, and
    the device providing step comprising providing the device, via the predictive program, being capable of playing a plurality of media files to a user, of receiving the motion signal, and of selectively rejecting a currently playing media file of the plurality of media files based on a determination that the motion signal indicates a characteristic negative head-nod gesture by the user, wherein the device providing step comprises providing the device being capable of ceasing playing the selectively rejected media file, and whereby a current play of a selectively rejected media file is ceasable by the device.

10. The method of claim 9, wherein the device providing step comprises providing the device to recognize a motion signal that indicated the characteristic negative head-nod gesture, the characteristic negative head-nod gesture comprising at least one motion selected from a group consisting essentially of a substantially right-left-right head motion and a substantially left-right-left head motion.

11. The method of claim 9, wherein the accelerometer providing step comprises providing the accelerometer being functionally coupled with the user's head by way of at least one element selected from a group consisting essentially of a pair of headphones and a pair of earbuds, the at least one element being worn by the user.

12. The method of claim 9, wherein the device providing step comprises providing the device with integrated hardware and software.

13. The method of claim 9, wherein the device providing step comprises providing the device being capable of rejecting the currently playing media file only if the characteristic negative head-nod gesture is imparted during an initial time period following inception of the playing of the currently playing media file.

14. The method of claim 9, wherein the device providing step comprises providing the device to recognize the initial time period comprising a range of approximately 20 seconds.

15. The method of claim 14, wherein the device providing step comprises providing the device being capable of playing the currently playing media file in response to an automated media selection feature.

16. The method of claim 9, wherein the device providing step comprises providing the device to recognize a motion signal that indicated the characteristic negative head-nod gesture, the characteristic negative head-nod gesture comprising at least one motion selected from a group consisting essentially of a substantially right-left-right head motion and a substantially left-right-left head motion, wherein the accelerometer providing step comprises providing the accelerometer being functionally coupled with the user's head by way of at least one element selected from a group consisting essentially of a pair of headphones and a pair of earbuds, the at least one element being worn by the user, wherein the device providing step comprises providing the device with integrated hardware and software, wherein the device providing step comprises providing the device being capable of rejecting the currently playing media file only if the characteristic negative head-nod gesture is imparted during an initial time period following inception of the playing of the currently playing media file, wherein the device providing step comprises providing the device to recognize the initial time period comprising a range of approximately 20 seconds, and wherein the device providing step comprises providing the device being capable of playing the currently playing media file in response to an automated media selection feature.

17. A method of using a hands-free user-interface system by way of a portable media player device, comprising:

providing an accelerometer being functionally coupled to a user's head and being configured to generate a motion signal in response to a user-imparted head motion; and providing a portable media player device, the device providing step comprising providing a predictive program, the device providing step comprising providing the device being in electronic communication with the accelerometer via the predictive program, and the device providing step comprising providing the device, via the predictive program, being capable of playing a plurality of media files to a user, of receiving the motion signal, and of selectively rejecting a currently playing media file of the plurality of media files based on a determination that the motion signal indicates a characteristic negative head-nod gesture by the user, wherein the device providing step comprises providing the device being capable of ceasing playing the selectively rejected media file, and whereby a current play of a selectively rejected media file is ceasable by the device;

playing a media file of the plurality of media files, thereby providing the currently playing media file;

imparting the characteristic negative head-nod gesture by the user, wherein the characteristic negative head-nod gesture comprises at least one motion selected from a group consisting essentially of a substantially right-left-right head motion and a substantially left-right-left head motion; and ceasing playing the selectively rejected media file.

18. The method of claim 17, wherein the accelerometer providing step comprises providing the accelerometer being functionally coupled with the user's head by way of at least one element selected from a group consisting essentially of a pair of headphones and a pair of earbuds, the at least one element being worn by the user.

19. The method of claim 17, wherein the ceasing step comprises the device rejecting the currently playing media file only if the characteristic negative head-nod gesture is imparted during an initial time period following inception of the playing of the currently playing media file.

20. The method of claim 19, wherein the ceasing step comprises the device recognizing the initial time period comprising a range of approximately 20 seconds.

21. The method of claim 17, wherein the playing step comprises the device playing the currently playing media file in response to an automated media selection feature.

22. The method of claim 17, wherein the accelerometer providing step comprises providing the accelerometer being functionally coupled with the user's head by way of at least one element selected from a group consisting essentially of a pair of headphones and a pair of earbuds, the at least one element being worn by the user, wherein the ceasing step comprises the device rejecting the currently playing media file only if the characteristic negative head-nod gesture is imparted during an initial time period following inception of the playing of the currently playing media file, the ceasing step comprises the device recognizing the initial time period comprising a range of approximately 20 seconds, and wherein the playing step comprises the device playing the currently playing media file in response to an automated media selection feature.

* * * * *